United States Patent [19]

Harvey et al.

[11] Patent Number: 4,645,613

[45] Date of Patent: Feb. 24, 1987

[54] HEAT STORAGE COMPOSITION

[75] Inventors: Nathan A. Harvey, Holcomb; Roland M. Avery, Jr., Pittsford, both of N.Y.

[73] Assignee: John D. Brush & Co., Inc., Rochester, N.Y.

[21] Appl. No.: 754,631

[22] Filed: Jul. 15, 1985

[51] Int. Cl.$^4$ .................................................. C09K 5/06
[52] U.S. Cl. ...................................... 252/70; 109/65; 109/78; 109/80; 109/84; 165/104.13; 165/104.17; 165/902; 252/62; 312/214; 428/921
[58] Field of Search ........................ 252/62, 70; 109/78, 109/80, 84, 65; 165/104.13, 104.17, 902; 428/921; 312/214

[56] References Cited

U.S. PATENT DOCUMENTS

| | | | |
|---|---|---|---|
| 3,559,594 | 2/1971 | Miller | 109/84 |
| 3,762,787 | 10/1973 | Grubb | 109/80 |
| 3,888,557 | 6/1975 | Anderson et al. | 109/80 |
| 3,986,969 | 10/1976 | Telkes | 252/70 |
| 4,248,291 | 2/1981 | Jarmul | 165/104.11 A |
| 4,263,365 | 4/1981 | Burgess et al. | 428/310 |

OTHER PUBLICATIONS

"Sodium Compounds (Carbonates)", M. Kirk-Othmer Encyclopedia of Chemical Technology, 2nd ed., 1969, pp. 458–459.

Weast, Ed., "Handbook of Chemistry and Physics, 55th ed.", CRC Press, 1974, pp. 6137 and 6246.

"Technical Performance Data on Sodium Sulfate Decahydrate ($Na_2SO_4 \cdot 10H_2O$)", Institute of Energy Conversion, University of Delaware, Dec. 1, 1977.

*Primary Examiner*—Robert A. Wax
*Attorney, Agent, or Firm*—Stonebraker, Shepard & Stephens

[57] ABSTRACT

A heat storage composition for use as a medium to protect objects such as floppy disks from damage by heat is formed of a major portion by weight of the septahydrate of sodium carbonate and a lesser proportion by weight of the monohydrate of sodium carbonate, with the compositions being substantially free of cementitious materials and thixotropic agents.

6 Claims, No Drawings

HEAT STORAGE COMPOSITION

FIELD OF INVENTION

This invention relates to a heat storage composition that is particularly useful as a protective medium for fire-resistant storage containers.

BACKGROUND

Low cost metal salts have been disclosed as useful in heat storage compositions. U.S. Pat. No. 3,986,969 has disclosed compounds of sodium, potassium, magnesium, aluminum, and iron for this purpose. Preferably, the compounds are in the form of chlorides, nitrates, sulfates, phosphates, and carbonates. Sodium carbonate decahydrate and disodium phosphate dodecahydrate are mentioned specifically. Sodium sulfate decahydrate is one of the preferred compounds disclosed in U.S. Pat. No. 3,986,969; and the technical performance data of sodium sulfate decahydrate as a thermal energy storage medium is provided in the bulletin from the Institute of Energy Conversion at the University of Delaware, dated Dec. 1, 1977.

In U.S. Pat. No. 4,263,365 sodium sulfate decahydrate, sodium carbonate decahydrate, and sodium tetraborate are described as being useful in compositions for the preparation of panels to be used in fire-resistant safes.

In order that the heat storage compositions can provide the necessary protection against damage caused by heat and fire, the compositions must be stable when heated; and the compositions must have an isothermal plateau below 125° F., and preferably below 100° F. to protect such objects as floppy disks and other electronic records as well as microfilm, microfiche, and the like. The prior art compositions have contained stabilizers, nucleating agents, thixotropic agents, cementitious materials, cellulose fibers, polyolefin fibers, and other additives so that the compositions could be used as heat storage media. However, in spite of the presence of these additives, many of the prior art compositions do not have the thermo physical properties to protect floppy disks and other electronic records in safes or other storage containers by maintaining the temperature in the storage containers sufficiently low to prevent damage caused by heat from fire.

SUMMARY OF THE INVENTION

In accordance with this invention, it has been found that certain heat storage compositions can be used as protective media to maintain the temperature in safes or other storage containers sufficiently low to prevent heat damage to objects, such as floppy disks, that may be stored in those containers. The inventive heat storage compositions comprise the septahydrate of a salt selected from the group consisting of sodium carbonate and disodium phosphate and containing a lower hydrate of the same salt. The heat storage compositions are not required to contain additives, such as stabilizers, thixotropic agents, cementitious materials, and the like.

DETAILED DESCRIPTION

The heat storage compositions of this invention comprise the septahydrate of a salt selected from the group consisting of sodium carbonate and disodium phosphate and a lower hydrate of the same salt. The preferred composition contains a major portion by weight of the septahydrate of sodium carbonate and a lesser amount by weight of the monohydrate of sodium carbonate. The compositions are substantially free of cementitious materials and thixotropic agents. The most preferred composition contains about 70% by weight of the septahydrate of sodium carbonate and about 30% by weight of the monohydrate of sodium carbonate.

The compositions of this invention are prepared by adding the metal salt in a finely divided or powdery form to water. The amount of metal salt that is used is in excess of the stoichiometric amount needed to form the septahydrate of the metal salt. For example, in forming the most preferred composition, an amount of sodium carbonate in excess of the amount needed to form the septahydrate is added to water; and, as a consequence, both the septahydrate and the monohydrate of sodium carbonate are formed. Although the amount of septahydrate and monohydrate can be varied, it is preferred to use the sodium carbonate in an amount sufficient to provide a final composition containing about 30% by weight of the monohydrate and about 70% by weight of the septahydrate.

In the compositions of this invention, the monohydrate of the metal salt appears to have a stabilizing effect so that, when the compositions are heated, the compositions do not liquefy. Actually, when these compositions are heated, they become rather pasty and they do not undergo phase separation.

While the metal salt is being added to water, the composition is stirred, for example, with a paddle mixer. The mixture heats exothermically to a temperature at which the septahydrate melts but the monohydrate does not melt. A slurry of the monohydrate in the molten higher hydrate is formed, and that slurry is then poured into molds to produce panels for use in fire-resistant containers, such as safes as described in U.S. Pat. No. 4,263,365. Such containers have an inner liner and an outer shell, and the panels of this invention are placed in those containers between the inner liner and outer shell. Preferably, the panels are strapped or otherwise fastened into position leaving unfilled space between the inner liner and outer shell, and that unfilled space is then filled with a foamed polyurethane to provide additional insulation to the container and mechanical stability to the panel.

SPECIFIC EXAMPLE

Add 37.5 pounds of cold water to a paddle mortar mixer. Add 50 pounds of light soda ash (sodium carbonate) in a finely divided (not granular) form. The soda ash is added slowly to prevent lump formation. Add another 37.5 pounds of water to the mixture and then slowly add another 50 pounds of soda ash. The mixture is stirred constantly, and the temperature rises exothermically to about 110° F. to form a slurry of the monohydrate in the higher hydrate. The slurry is then poured into molds lined with plastic sheeting; and, after cooling, the billets or panels are removed from the molds and heat sealed. The panels are then placed around the inside jacket or inner liner of a safe and strapped into place. The outer jacket of the safe is then placed around the inner liner leaving an annular space of about 0.75 inches that is filled with a polyurethane foam.

We claim:

1. A fire-resistant storage container for protecting heat-sensitive objects that are damaged by temperatures above 125° F., a protective wall of said container having been prepared from a composition comprising the septahydrate of a salt selected from the group consisting of sodium carbonate and disodium phosphate and containing a lower hydrate of the same salt, said composition being substantially free of cementitious materials and thixotropic agents.

2. A fire-resistant safe for protecting heat-sensitive objects that are damaged by temperatures above 125° F., a protective wall of said safe having been prepared from a composition comprising about 70% by weight of the septahydrate of sodium carbonate and about 30% by weight of the monohydrate of sodium carbonate, said composition containing no cementitious materials or thixotropic agents.

3. The fire-resistant safe of claim 2 wherein the protective wall of said safe contains said composition disposed inside an outer layer of polyurethane.

4. A heat-resistant panel for use in fire-resistant containers for protecting heat-sensitive objects that are damaged by temperatures above 125° F., said panel having been prepared from a composition comprising the septahydrate of a salt selected from the group consisting of sodium carbonate and disodium phosphate and containing a lower hydrate of the same salt, said composition being substantially free of cementitious materials and thixotropic agents.

5. The panel of claim 4 wherein the heat-storage composition is contained within a layer of polyurethane.

6. A heat-resistant panel for use in a fire-resistant safe for protecting heat-sensitive objects that are damaged by temperatures above 125° F., said panel having been prepared from a composition comprising about 70% by weight of the septahydrate of sodium carbonate and about 30% by weight of the monohydrate of sodium carbonate, said composition containing no cementitious materials or thixotropic agents.

* * * * *